United States Patent Office 3,553,272
Patented Jan. 5, 1971

3,553,272
COMPOSITIONS FOR AND METHODS OF INHIBITING THE DISCOLORATION OF ALKYLATED PHENOLS
Charles P. Riley, Jr., Chelmsford, Mass., assignor to National Polychemicals, Inc., Wilmington, Mass., a corporation of Massachusetts
No Drawing. Continuation-in-part of application Ser. No. 549,189, May 11, 1966. This application Mar. 13, 1967, Ser. No. 622,405
The portion of the term of the patent subsequent to Jan. 14, 1986, has been disclaimed
Int. Cl. C07c *39/06*
U.S. Cl. 260—624         10 Claims

ABSTRACT OF THE DISCLOSURE

The discoloration of alkylated phenols is inhibited by the addition of an organic phosphite to the alkylated phenol or comelt of the alkylated phenol with thiodipropionic acid esters. The phosphite such as tris nonylphenyl phosphite may be incorporated as an additive to the melted product or during processing provided that it is incorporated and the stabilized product processed under substantially nonhydrolysis conditions i.e. avoidance of aqueous solution, heat and acids.

For example, butylated hydroxy toluene is prevented from yellowing in storage by the addition of tris nonylphenyl phosphite to the melt or comelt of the final product or when it is incorporated at a point in the alkylation process which avoids latter hydrolysis of the phosphite so incorporated.

CROSS-REFERENCE TO RELATED APPLICATION

This application is a continuation-in-part of my copending application, Ser. No. 549,189 filed May 11, 1966 entitled Compositions for and Methods of Inhibiting the Discoloration of Alkylated Phenols.

BACKGROUND OF THE INVENTION

A wide variety of polymers which are subject to degradation require the addition during the polymerizing process, or thereafter, of one or more antioxidants. Such polymers often include natural and synthetic elastomers as well as thermoplastics, and particularly those polymers which contain processing or catalytic residues therein and which are subject to rapid degradation in color or physical properties upon use or exposure to oxygen. It is common practice to include in such polymers small antioxidant amounts of from about 0.001 to 5.0 percent by weight or more, of one or more antioxidant additives.

Typically, a primary antioxidant additive is employed in such polymers in combination with a secondary antioxidant additive. The secondary antioxidant additive is usually employed in excess over the primary antioxidant additive often in an amount ranging from about 1 to 1 to 1 to 5. The combination of antioxidants may be added to the polymer at the same or different times. The primary antioxidant is added in theory to serve as a free radical terminator, and therefore, to prevent the loss of desirable properties in the polymer. However, the use of a primary antioxidant such as a hindered phenol alone is often not sufficient, and one or more secondary antioxidants such as thioesters are employed to remove by reduction or otherwise any hydroperoxides which might be formed by the primary antioxidant and to reduce the peroxides to inert compounds. The hindered phenols employed as the primary antioxidants are commonly alkylated phenols or methylene or thio-bis alkylated phenols or similar high-weight solid antioxidant compounds. The thioesters, such as thiodipropionic acid esters, usually have a lower molecular weight and correspondingly lower melting points.

Hindered phenols are usually characterized by a white, light or off-white color, but exhibit a tendency to yellow and darken in color on aging. This is particularly true if the material is stored at elevated temperatures of 25° C. or greater. Any yellowing or darkening in color reduces the overall aesthetic appearance of the antioxidant to the user and gives rise to color problems when used in colorless, white or light-colored polymers. For example, butylated hydroxy toluene (BHT), a commonly used antioxidant, is normally available as a white solid, but turns yellow on aging either when used alone or in a mixture or comelts with other antioxidant additives.

It is often desirable to form a mixture of a hindered phenol and the thioester and to then incorporate the mixture into the polymer at the appropriate time. However, such mixtures often present a difficult handling problem in polymer plants, particularly during hot weather, since the lower melting point product tends to sinter in such mixtures. Such sintering, or the tendency of the powdered low-melting particles to stick together during hot weather, is particularly troublesome when the additive is employed in automatic handling equipment.

Alkylated phenols including bisphenods having alkyl groups may be prepared by several known processes such as those set forth in U.S. Pat. No. 3,256,346 and other patents. For example, alkylated phenols like 2,6-ditertiarylbutyl-4-methyl phenol (BHT) are typically prepared by the alkylation of phenol or an alkyl phenol like paracresol in the presence of a catalyst like a Friedel-Craft catalyst or acid catalyst like sulfuric acid through the introduction of a $C_2$–$C_4$ alkylene like isobutylene (or an alcohol) to provide the butylated phenol product. The reaction mixture is then neutralized by the addition of sodium carbonate or other alkali agent. The mixture is then fractionated usually under vacuum to strip volatile material such as unreacted isobutylene, polymeric side materials, water, solvents and free cresol from the mixture and the alkylated phenol product (BHT) recovered as a low melting point solid. For use as a food grade material, the BHT is recrystallized one or more times from a solvent solution such as an alcohol e.g., as an $C_1$–$C_4$ alkanol like isopropanol. The BHT freezing point requirement of at least 69.2° F. for food grade material can also be obtained by careful processing without the recrystallization step. The BHT product can also be processed by a less expensive flaking technique after distillation such as chilling of the BHT on a cold drum. Flaked BHT can meet the food grade freezing point requirements, but is not so employed because of its more yellowing tendencies. Thus, an additive or process which permits flaked BHT to be more resistant to color change so that it could be offered as food grade BHT would be most desirable.

In the past, various techniques and additives have been suggested to prevent the yellowing of BHT and other hindered phenols, however, none have proven commercially successful and yellowing BHT continues to date as a commercial problem. For example, U.S. Pat.No. 2,727,928 (Reissue 24,834) discloses the treatment of alkyl phenols with a poly functional acid of a phosphorus compound. U.S. Patent No. 3,168,578 employs a hypophosphorus acid during the preparation of an alkyl phenol to inhibit subsequent color changes, in the phenol. U.S. Patent No. 2,752,398 teaches the addition of phosphoric acid to a phenol, while U.S. Patent No. 2,672,485, suggests the use of polybasic carboxylic acids or salts with alkyl phenols.

U.S. Pat. No. 3,256,346 discloses the use of certain phosphites alone with other materials in the process of preparing alkylated bisphenols to prevent discoloration of the bisphenol product. It is an essential and critical feature of the disclosure that the decolorizing additive be added to a neutralized crude reaction mixture and prior to distillation of the crude product (Column 1, lines 66–69). Further, it is stated that such discoloration agents disclosed are of no value when used during the reaction or after distillation of the reaction product.

Example 6 of U.S. Patent No. 3,256,346, employs as a discolorizing agent trisnonyl phenyl phosphite which is described as added after neutralization and before steam distillation at 150° C. The Gardiner color value for the treated product of the process was 14 compared to 18 for the untreated sample. The actual color difference would be between a light maple syrup color for the value 14 as against a very dark maple syrup color for the value 18. The tris nonyl phenyl phosphite added to the bisphenol under the conditions specified in U.S. Pat. No. 3,256,346 hydrolizes during steam distillation to nonyl phenol and phosphorous acid. As known, phosphorous acid has a moderate decoloring effect and this accounts for the very small improvement obtained in this example. The treated product even as produced would therefore be unsatisfactory for food grade use or for most commercial uses where a white or light color is required, while there is no evidence to suggest that further darkening of color could be prevented during storage.

SUMMARY OF THE INVENTION

I have found that blends of hindered phenols and thioesters can be melted together to form low-melting point mixtures or comelts. These comelts can be liquid or solid, depending upon temperature of use, the relative melting points of the components, and the amount of the components of the comelt. Such low-melting comelts are advantageous since they insure the proper proportioning of the primary and secondary antioxidants and inhibit segregation of the antioxidant components. I have found that blends of butylated hydroxy toluene (BHT) and lauryl thiodipropronic acid ester form an eutectic mixture of very low-melting point (29–33° C.). Such a eutectic mixture permits the combination of ingredients to be handled as a liquid particularly upon gently heating or during periods of hot weather and to be pumped and metered in a much more efficient manner than with the separate addition of solid compounds. Such liquid eutectic mixtures avoid the sintering problems experienced with such low-melting thioester compound. However, I have also discovered that such comelts have on testing, shown a pronounced tendency to yellow upon shelf aging due to the presence of the hindered phenol.

I have found that the tendency of hindered phenols, such as butylated hydroxy toluene or admixtures or comelts of hindered primary antioxidants and secondary thio-antioxidants, to yellow or darken in color upon aging may be inhibited or prevented by the addition of an organic phosphite to the phenolic compound or by the use, under nonhydrolysis conditions, of the phosphite in the process of preparing the phenolic compound. Typically, color degradation is prevented by the addition of a small but color-inhibiting amount of from 0.01 to 10 percent by weight usually (0.5 to 3.0) of a white or light colored organic phosphite to a mixture, blend or particularly a melt or comelt of the final phenolic compound. Such addition to a hindered phenol or a stabilizing co-blend containing a hindered phenol is usually sufficient to extend significantly and most unexpectedly the storage life of the hindered phenol or the mixture without discoloration or at least retard further discoloration.

The advantages of my discovery are particularly important to the usually white monohindered phenolic antioxidants like BHT and to those low-melting point eutectic mixtures which combine the advantages of non-discoloration and liquid metering of the additive to the polymer.

Although small amounts of organic phosphite are sufficient to prevent discoloration, the hindered phenols and mixtures thereof may contain an excess of the same or different organic phosphites, for example, the organic phosphite may perform another function such as stabilizing additive in the resulting polymer. It is, therefore, possible by my invention to provide a unique stabilizing mixture comprising a prmary antioxidant or a primary and a secondary antioxidant together with an organic phosphite such as trisnonyl phenyl phosphite. In addition, my discovery permits flaked alkylated phenols like BHT to be stabilized by simply adding an organic phosphite to the flaked material melt to provide a food grade product. Further, my invention permits the alkylated phenol to be stabilized effectively during the process of alkylation by observing certain conditions in the use of phosphite.

I have found that despite any contrary teachings that the simple addition of an organic phosphite to a melt, dry blend or mixture, or to an organic solution of alkylated phenol provides significant and most unexpected color stabilizing properties. In particular, the addition of a tris $C_8$–$C_{12}$ alkylated phenyl phosphite to a melt of BHT has been effective to prevent any significant change in color for at least a six month period under usual storage conditions. It is recognized that it is often more convenient to color stabilize the phenolic compound during its process of preparation rather than incorporating an additional step into the process. The addition of the phosphite to the melt or a dry mixture or powdered blend is effective since such technique avoids hydrolysis of the phosphite which would substantially reduce if not destroy its color stabilizing effectiveness.

I have found that organic phosphites as color stabilizers may be added during preparation of the alkylated phenol provided that the subsequent processing steps after such addition do not significantly hydrolyze or extract the phosphite additive so employed, so the additive is retained in the final product. Thus, it is an essential feature of my invention that the reaction mixture of an alkylated phenol, containing for example a hydrolyzable phosphite like trisnonyl phenyl phosphite, avoids hydrolysis conditions such as water, acid, or water and high temperatures. Further, the additive used should not be substantially removed in a subsequent solvent extraction or recrystallization step. It is recognized that phosphites have different resistances to hydrolysis and differences in solubility so that a selection of the desired phosphite must be made in the light of all of its pertinent properties and the process in which it is employed. For example, commercially available FDA approved phosphites like trisnonyl phenyl phosphite are preferred, but more hydrolysis-resistant polymeric type phosphites may be employed where some hydrolysis conditions are impracticable to avoid. Where necessary, a predetermined excess of the phosphite may be used to make up solvent or hydrolysis loss of the phosphite.

In use, the phosphite should be employed under reasonable water-free or anhydrous conditions and after neutralization of any acid e.g. at a pH range of 6 to 8. The phosphite additive may be added to the product just before or during the flaking step, and during or after the solvent recrystallization step. Addition prior to or at the early stages of recrystallization is dependent upon the solubility of the additive, and the solvent and temperatures used so that the additive will be retained in the product.

My discovery as to the color stabilizing of alkylated phenols is contrary to the teaching of U.S. Pat. No. 3,256,346, as to bisphenols. It is believed that the poor color stabilizing results achieved in comparison to the very significant and unexpected improved results of my invention was due to the hydrolysis of the phosphite in Example 6 on steam distillation of the mixture with the phosphite additive. Such process treatment would significantly effect the hydrolysis decomposition of the tris nonylphenyl phosphite to the nonyl phenol and phosphorous acid. Phosphorous acid was a previous known color stabilizer, but is relatively unsatisfactory. The Gardiner color value of 14 for the treated product where a Gardiner value of 1 to 3 is white or off-white indicates little commercially acceptable color stabilization by this technique. My invention avoids the poor results and teachings of this patent, and provides a simple commercially inexpensive means to prevent discoloration over extended time periods of alkylated phenols.

The component of my stabilizing additive may, therefore, vary widely in amounts depending upon the protection desired and the resulting polymer to which the antioxidant mixture is to be incorporated, as well as the form of the comelt desired, i.e., liquid or solid. For example, my primary and secondary antioxidants may be combined in amounts ranging from about 5 to 95 percent of the mixture, while the organic phosphite may range from about 0.1 to 95 percent of the mixture although 0.05 to 10.0 percent is generally sufficient for stabilizing the antioxidant. In general, the secondary antioxidant may range from about a 1 to 1 to 1 to 5 ratio over the primary antioxidant, although this may be varied where the polymer already contains the same or a different antioxidant or where additional amounts of a rather low-melting compound is desired in the mixture in order to form a eutectic mixture. Those colorless, white, off-white or light-colored antioxidants and organic phosphites that are commonly employed in industry are suitable for and may be incorporated in my compositions.

Those antioxidant mixtures which form liquids, particularly upon the application of gentle heat or during the hot summer months, are particularly desirable. A comelt should have a melting point of less than about 50° C. to be advantageous, and particularly low-melting compositions of less than 35° C. are preferred. My stabilized antioxidant compositions may contain other additives useful for incorporation into the polymer, such as for example, fillers, pigments, carbon black, plasticizers, solvents, oils, waxes, amines, glycols, polyglycols, curing agents, scorch inhibitors, and other additives. If desired, other low melting inert additives as carriers may be incorporated to lower or control the melting point of the comelt.

Typical primary antioxidants which may be stabilized and employed in my stabilizing mixtures include those sterically hindered phenols commonly or usefully employed as antioxidants which are subject to discoloration on processing, aging, storage or heat. Typical hindered phenols would include alkylated phenols such as those containing one or more lower alkyl groups, e.g., $C_1$-$C_4$ groups like a tertiary butyl group in the 6 position, as well as those alkalene-bis alkylated phenols such as the 2, 2'-alkylene-bis-4, 6 dialkyl phenols, or other such hindered phenols. Specific examples include 2, 6 ditertiary butyl paracresol, 2,2' methylene bis (4-methyl-6-tertiary butyl) phenol and 2-tertiary butyl-paracresol and the like, and combinations thereof. Typical hindered phenols and antioxidant mixtures are described in U.S. Patent Nos. 2,538,355; 3,069,369; 3,103,501; 3,149,093 and others.

Typical secondary antioxidants which may be employed include organic thio compounds such as thioesters, thioalkanonic acids, organic sulfides and disulfides. Common thioesters employed would include dithiodipropionic acid and its salts, particularly the oil soluble salts formed by reaction with polyglycols or fatty alcohols. Specific compounds include the fatty acid esters and mixed esters of thiodipropionic acid such as dilauryl thiodipropionate (melting point 39°–40.5° C.), and mixed laurel-stearyl thiodipropionate.

Any organic phosphite may be employed in my stabilizing mixture to inhibit or prevent discoloration. The preferred organic phosphites include those which are now commonly employed in stabilizers and readily available, as well as those approved for use by the Food and Drug Administration. Such organic phosphites include trialkylaryl, trialkyl, triaryl, dialkylaryl and diarylalkyl, as well as hydroxy-hydrocarbon-substitutes and other organic phosphites include phosphorus-containing polymers such as seters phosphites and phosphite polymers prepared by the reaction of a phenolic phosphite with formaldehyde or by the reaction of phenol-formaldehyd novolak with a trivalent phosphorus compound such as phosphorus trichloride. These latter phosphite polymers are more fully described in a copending application Ser. No. 462,385, filed June 8, 1965 now U.S. Pat. No. 3,367,996. Other phosphite polymers include those prepared from bisphenol A, pentaerythritol, glycols and polyglycols.

Specific preferred phosphites include the $C_3$-$C_{12}$ alkyl phenyl phosphites such as tris nonylphenyl phosphite. Typical phosphites useful in my discovery comprise substituted organic phosphites like alkyl, alkylene, alicyclic, aryl, alkylated-aryl, and mixed alkyl aryl phosphites particularly the tris hydrocarbon substituted phosphites such as those containing one or more phenyl and alkylated phenyl groups. The selection of a particular phosphite and its amount depends on factors, as discussed, since the efficiency of the phosphites may vary. In general my organic phosphites include specifically diisodecyl nonylphenyl phosphite, triphenyl phosphite, tri-isodecyl phosphite, diphenyl-decyl phosphite, phenyldidecyl phosphite, and trioctylphenyl phosphite. In addition, I have found that the presence in any stabilizing composition of from about 5 to 50 percent by weight of a borate based on the phosphite-borate amount further inhibits color degradation. Typical borates which include hydrocarbon-substituted borates like phenyl, alkyl and mixed alkyl-phenyl and alkyl-substituted phenyl borates such as tributyl borate, triphenyl borate, diphenyl butyl borate, and 2,6,-di-tertiary-butyl-4-methyl phenyl di-butyl borate. Borates when incorporated in the stabilizing mixture of the antioxidant and the phosphite are effective in further preventing discoloration. Typical organic phosphites for use in my invention are described more particularly in U.S. Pat. No. 3,244,662.

DESCRIPTION OF THE PREFERRED EMBODIMENTS

The advantages of my invention may be shown by the following examples illustrating the stabilization of a typical commercial primary antioxidant of butylated hydroxy toluene (BHT) and a comelt of BHT and a secondary antioxidant dilauryl thiodipropionate (DLTDP). The butylated hydroxy toluene (BHT) is a white solid having a melting point of about 69° C., while the secondary antioxidant DLTDP melts at approximately 40° C. The DLTDP is a sticky, waxy solid which tends to sinter in hot weather.

Example 1

The color properties of butylated hydroxy toluene alone and with an organic phosphite additive at room temperature and at a higher temperature were observed with the results shown in Table I.

TABLE I.—BHT–TRISNONYLPHENYLPHOSPHITE STABILITY DATA

| Sample material | Days at room temperature (20–25° C.) | Days at 50° C. | Sample color at end of test time |
|---|---|---|---|
| 1. BHT (no additive) | 7–10 | 2 | Yellow. |
| 2. BHT (0.1% by weight of trisnonylphenyl phosphite) | 15 | 15 | White.[1] |
| 3. BHT (0.50% by weight of trisnonylphenyl phosphite) | 15 | 15 | Do. |

[1] No discoloration.

Example 2

An amount of BHT was melted and to aliquot portions of the melt was added the following phosphites and the material tested as follows:

TABLE II.—BHT–PHOSPHITE STABILITY DATA

| Sample material | Test time, days at 50° C. | Sample color at end of test time |
|---|---|---|
| 1. BHT (no additive) | 2 | Yellow. |
| 2. BHT with 1% by weight diphenyl decyl phospoite | 20 | White. |
| 3. BHT with 1% by weight phosphite polymer [1] | 20 | Do. |
| 4. BHT with 1% by weight phosphite ester [2] polymer | 20 | Do. |
| 5. BHT with 0.95% by weight phosphite polymer and 0.05% by weight of dibutyl 2, 6 ditertiary-4-methyl phenyl dibutyl borate | 20 | Do. |

[1] A liquid soluble polymer prepared by the reaction of trisnonyl phenyl phosphite and less than a stoichiometric amount of formaldehyde.
[2] A liquid soluble polymer prepared by the reaction of a nonyl phenol-formaldehyde resinous novolak with phosphorous trichloride.

Example 3

BHT was stored at room temperature about (65°–85° F.) in direct sunlight with and without a trisnonyl phenyl phosphite additive. The TNPP was incorporated in the BHT melt with the following results:

TABLE III.—BHT–TNPP STABILITY DATA

| Sample material | Test time in days | Color at end of test time |
|---|---|---|
| 1. BHT (without additive) | 20 | Off-white. |
| 2. BHT with 1% TNPP | 330 | White. |

Example 4

A 1 to 1 mixture of the primary (BHT) and a secondary antioxidant (DLTDP) was melted together to form a eutectic composition having a low melting point in the range of from about 29 to 32° C. No significant change in the melting point of this BHT–DLTDP mixture was found in the range of from 1 to 1 to 1 to 3 of primary to secondary antioxidant. The low melting point mixture, thus, can be handled in liquid form. Nondiscoloring comelts of these two products are most desirable. Such a comelt was tested with and without the addition of an organic phosphite as follows:

TABLE IV.—BHT AND DLTDP BLENDS 1:1 PLUS TRIS NONYLPHENYLPHOSPHITE

| Trisnonylphenylphosphite concentration, percent | Days at room temperature, 20–25° C. | Molten, days at 50° C. | Sample color |
|---|---|---|---|
| 1 | 3.0 | 56 | 56 | White. |
| 2 | 1.0 | 44 | 44 | Do. |
| 3 | 0.5 | 39 | 39 | Do. |
| 4 | 0.1 | 39 | 17* | Do. |
| 5 | None | | 2 | Yellow. |

*Started to yellow after 17 days at 50° C. Room temperature sample did not yellow through 39 days.

The data of Table IV demonstrates that the addition of an organic phosphite to the antioxidant comelt completely inhibits color formation for an extended time period, while the comelt product remains white in color in both solid and molten form.

Example 5

The test of Example 4 was repeated employing different phosphites as follows:

TABLE V

| Sample material | Test time at room temperature (65–85° F.) | Sample color at end of test time |
|---|---|---|
| 1. BHT/DLTDP | 6 | Yellow. |
| 2. BHT/DLTDP plus 1% by weight phosphite polymer | 365 | White. |
| 3. BHT/DLTDP plus 1% by weight phosphite ester polymer | 365 | Do. |
| 4. BHT/DLTDP plus 1% by weight trisnonyl phenyl phosphite | 365 | Do. |

Example 6

A stabilized BHT product is prepared by reacting about 1.0 moles of a paracresol containing a catalyzing amount of sulfuric acid with about 2.2 moles of isobutylene, which is bubbled into the paracresol as a gas through sparger. The reaction is carried out of a temperature of 40 to 60° C. to alkylate the paracresol and provide a crude reaction mixture containing both the mono and dibutylated paracresol (BHT) product. The reaction mixture is neutralized with an aqueous solution of an alkali such as sodium or potassium hydroxide or carbonate. The neutralized mixture is then fractionated under a vacuum of less than one inch mercury (20 mm.) at a temperature of 175–250° C. to remove water, free paracresol, butene polymers, and unreacted isobutylene, as overhead material. The BHT from the bottom mixture containing mono and dibutylated paracresol may be recovered by fractionating-flaking, or crystallization or other process steps.

(a) In a fractionating recovery, the bottom mixture is fractionated at a temperature of under 160° C. such as 140–160° C. under vacuum (e.g. 20 mm.). The last fraction recovered is the desired BHT product into which about 0.5 to 5 percent by weight of trisnonyl phenyl phosphite or other phosphite is incorporated. The color stabilized BHT product is then chilled by a flaking operation on a cold water chilled drum to provide a non-yellowing food grade BHT, which is white in color and remains white at least for three days at 50° C.

(b) In the recovery of the BHT through a crystallization process, the crude bottom mixture was dissolved in warm (50–70° C.) relatively anhydrous isopropanol about 1% water. About 1 to 5 percent by weight, based on the BHT, of trisnonyl phenyl phosphite was added to and dissolved in the isopropanol solution, and the solution then cooled to crystallize out the desired color stabilized BHT product. The BHT so prepared was white in color (Gardiner value 3 or less) and remained white after seven days storage at 50° C.

In the processes described, the addition of the phosphite was made at a point in the process to avoid hydrolysis conditions, i.e. after fractionating to avoid heat, water and acid conditions, or to an anhydrous alcohol solution. Addition of the phosphite to the aqueous mixture after neutralization and prior to distillation would be relatively ineffective for color stabilizing purposes. In the recrystallization process the phosphite due to its hydrocarbon groups and preferential solubility remain substantially with the crystallized product rather than in the motor liquor containing the mono product.

My stabilizing mixtures are useful for incorporation into a wide variety of polymers particularly where clear, white or light-colored polymers are desired. Typical polymers in which my compositions may be used include natural, and synthetic elastomers like natural rubber, copolymers of styrene and butadiene, nitrile polymers such as butadiene-acrylonitrile copolymers, as well as acrylonitrile-butadiene-styrene polymers, polybutadiene, polyisoprene, natural rubber, carboxylated elastomers, ethylene-propylene rubbery copolymers and diene modified terpolymers and the like. Other polymers include polyesters, acrylic resins such as high-impact polystyrene and styrene-modified resins and vinyl resin such as vinyl halide like polyvinyl chloride and copolymers of vinyl chloride with vinyl acetate and the like. Other thermoplastics in particular include olefinic resins such as polyethylene, polypropylene, ethylene-propylene copolymers, ethylene-butene copolymers, and the like.

My invention has been described with particular reference to the prevention of color change of alkylated phenols for use as antioxidants. However, organic phosphites may be employed in my discovery to prevent color degradation of alkylated phenols regardless of the particular use of the color stabilized composition.

What I claim is:

1. In the method of preparing a hindered alkylated phenol suitable for use as an antioxidant in polymer compositions which hindered alkylated phenol is prepared by providing a crude reaction mixture containing the hindered alkylated phenol, fractionating the crude reaction mixture and recovering a hindered alkylated phenol after fractionation, the improvement which comprises incorporating into the hindered alkylated phenol after fractionating and prior to recovering a color-stabilized hindered alkylated phenol a color-inhibiting amount of an organic phosphite selected from the group consisting of alkyl, phenyl, alkylated-phenyl and mixed alkyl-phenyl phosphites;

and recovering the hindered alkylated phenol containing the above organic phosphite, under substantially non-hydrolysis conditions to prevent the degradation of the organic phosphite employed as a color-inhibiting additive.

2. The method of claim 1 wherein the organic phosphite is a $C_8$–$C_{12}$ alkyl phenyl phosphite.

3. The method of claim 1 wherein the alkylated phenol is butylated hydroxy tolulene and the organic phosphite is trisnonylphenyl phosphite.

4. The method of claim 1 wherein recovering the hindered alkylated phenol is accomplished by cold flaking of the color-inhibited alkylated phenol fraction.

5. The method of claim 1 wherein recovering the hindered alkylated phenol is accomplished by crystallizing the color-inhibited hindered alkylated phenol from an alcohol crystallizing solution.

6. The method of claim 1 which includes incorporating the color-inhibiting amount of the organic phosphite into an alcohol crystallizing solution of substantially anhydrous alcohol and thereafter crystallizing and recovering the color-inhibited hindered alkylated phenol from said alcohol solution.

7. The method of claim 1 which includes adding to the color-inhibited recovered alkylated phenol a fatty ester of thiodiproprionic acid, the ester and the alkylated phenol being present in the ratio of from about 1 to 1 to 5 to 1.

8. The method of claim 1 which includes incorporating an amount from about 5–50% by weight of the organic phosphite of an organic borate selected from the group consisting of alkyl, phenyl, alkylated phenyl and mixed alkyl-phenyl borates.

9. The method of claim 1 wherein the alkylated phenol is butylated hydroxy tolulene and the color-inhibiting amount ranges from 0.01 to 10% by weight of the alkylated phenol.

10 A color-inhibited alkylated phenol prepared by the method of claim 1 and which includes from about 0.1 to about 10% by weight of the organic phosphite.

References Cited
UNITED STATES PATENTS

| | | | |
|---|---|---|---|
| 2,672,485 | 3/1954 | Menn et al. | 260—624 |
| 3,149,139 | 9/1964 | Meisent | 260—619D |
| 3,256,346 | 6/1966 | Albert et al. | 260—619 |

BERNARD HELFIN, Primary Examiner

W. B. LONE, Assistant Examiner

U.S. Cl. X.R.

252—397; 260—45.95